United States Patent Office 3,578,462
Patented May 11, 1971

3,578,462
YEAST LEAVENED BREAD DOUGH COMPOSITION AND PROCESS OF MANUFACTURE
Louis J. Smerak, Wayne, and Jason A. Miller, Dover, N.J., assignors to Caravan Products Co., Inc., Passaic, N.J.
No Drawing. Continuation-in-part of application Ser. No. 566,212, July 19, 1966. This application Dec. 2, 1969, Ser. No. 881,609
The portion of the term of the patent subsequent to Feb. 10, 1987, has been disclaimed
Int. Cl. A21d 2/02, 2/04, 8/04
U.S. Cl. 99—90
26 Claims

ABSTRACT OF THE DISCLOSURE

A yeast leavened bread dough containing a composition consisting essentially of about 0.0005 to 0.010 part by weight per 100 parts of flour employed in the dough of an oxidizing agent, about 0.03 to 1.0 part by weight of calcium salt per 100 parts flour employed in the dough, and catalytically active quantities of enzyme selected from the class consisting of fungal amylase and fungal protease, wherein the fungal alpha amylase enzyme is sufficient to provide between 3,000 and 150,000 SKB units for 100 pounds of flour employed in the dough and the fungal protease enzyme is sufficient to provide between 3,000 and 500,000 hemoglobin units for 100 pounds of flour employed in the dough.

---

This application is a continuation-in-part application of our patent application Ser. No. 566,212 filed July 19, 1966, now Pat. No. 3,494,770, issued on Feb. 10, 1970.

This invention relates to yeast raised baked products and to a process for manufacturing such products.

The process of fermentation has always played an important role in the manufacture of yeast leavened bakery products. It has been recognized to impart many valuable properties to the dough and to the ultimate baked product. For example, it is the process of fermentation which generates the gases necessary to achieve good and uniform loaf volume; it is fermentation which assists in achieving the proper extensibility of the bread which in turn affects the ability of the dough to be sheeted out; it is fermentation which promotes the ease with which the dough can be processed, particularly by machinery; and it is fermentation which contributes to the flavor, aroma and lightnes of the baked product.

As important as fermentation is, the conventional methods of bread manufacture require extended periods of fermentation time to achieve the beneficial results noted above. Although attempts have been made to shorten the fermenation time, these have generally been done with some sacrifice in one or more of the benefits that fermentation is noted for.

The two basic and conventional methods for the manufacture of yeast raised bread products are known as the "straight dough"method and the "sponge dough" method. In both methods, long periods are devoted to the fermentation processes which are essential to achieve workability or processability of the dough and to develop the desired qualities of grain, texture, loaf volume and flavor.

In the straight dough method all the ingredients of the formula, e.g. flour, sugar, shortening, milk powder, salt, yeast and water, are mixed into a pliable dough until it is fully developed or clears the sides of the mixer. The dough then is allowed to ferment for 1½ hours to 3 hours under controlled temperatures of 80–86° F. The dough is then divided, rounded, and given intermediate proof. It is then molded into designated shapes. The molded doughs are then panned and then proofed for 50–70 minutes at temperatures of 100–105° F. and 90–95% humidity. The proofed dough pieces are then baked at varying temperatures from 375–450° F. for times varying from 18 minutes to 30 minutes based on their size and quality level. Although the chemical activity associated with fermentation continues from the time of original mixing until baking of the loaf, it is nonetheless necessary to devote an elapsed period of between 1½ and 3 hours solely to the development of the proper dough properties through the fermentation process.

In the sponge dough method there is initially formed a "sponge" batch utilizing only part of the ingredients. The sponge is fermented over a long but wide ranging time, and is subequently mixed with the remaining ingredients prior to baking. For example, approximately 70% of the flour in the batch is mixed for about 6 minutes in a horizontal mix or along with the yeast and equivalent amount of water to produce a stiff dough with very little development. This is the "sponge." The sponge temperature is set at approximately 78° F. and then allowed to ferment in troughs for between 2½ to 5 hours. The sponge is then remixed with the other 30% of the flour and the rest of the ingredients, e.g. shortening, sugar, milk powder, salt and water. After the dough is again formed in slow speed in about one minute, it is then mixed in high speed for approximately ten minutes to full development. Then the dough is allowed to rest or relax in troughs for from 15 to 30 minutes, dependent upon the product to be produced, before automatic dividing. This rest period is called floor time. The dough is then processed as in the straight dough method for white bread through dividing, rounding, intermediate proofing, molding, panning, proofing and baking.

The sponge dough process is today the more commercially accepted method for preparation of yeast leavened baking products. This is due in part to advantages in scheduling permitted by the flexible fermentation schedule of the sponge and in part to the superior processability and also improved grain and tenderness as compared with the straight dough method.

Nonetheless, the sponge dough method has the decided drawbacks of requiring an extended fermentation period in the first instance and then requiring a fairly critical processing schedule once the dough has been re-mixed. The first drawback causes an extraordinarily long preparation schedule, tying up much equipment and room, and the second drawback risks the ruination of the dough through improper timing—whether caused by inadvertence or by mechanical failure. It is therefore a primary object of the present invention to provide a new bread making process that will essentially eliminate the fermentation time heretofore conventionally required for bread manufacture, while at the same time retaining and even improving upon the beneficial characteristics associated with the fermentation process.

It is an object of the present invention to provide a new bread making process in which steps of manufacture are simplified and the overall time for manufacture is substantially reduced.

It is a further object of the present invention to provide a quick and reliable method for the manufacture of yeast leavened bread dough products having improved volume, grain texture, flavor and shelf life.

It is another object of the present invention to provide a novel bread dough composition which promotes outstanding processing characteristics and improved baked bread quality, including outstanding freshness and self life.

In general, according to one aspect of the instant invention, an otherwise conventional bread dough recipe is modified to include about 0.03 to 1.0% of a calcium salt, about 0.0005 to 0.01% of an oxidizing agent, and catalytically active quantities of fungal alpha amylase enzyme and fungal protease enzyme (all percentages based on weight of total flour in the dough).

In our previously referred to patent application, we have disclosed and claimed a composition comprising an ammonium salt in combination with the remaining ingredients. The present invention is predicated on the discovery that a particular combination and concentration of oxidizing agent, calcium salt and enzyme permits a remarkable reduction in the fermentation time without any sacrifice in the physical or eating qualities of the bread product. The reduction is equal to or greater than that disclosed in Ser. No. 566,212. Indeed, it has been found that the time ordinarily associated with fermentation in the straight dough and sponge dough processes can be eliminated entirely, there being provided only the relatively short floor time prior to proofing.

As a result of the elimination of the standard time devoted to fermentation, it is possible to make the bread product by a convenient and substantially faster straight dough method, while at the same time exceeding the superior qualities associated with the sponge dough process. In this respect the inventive process eliminates all need for sponge dough proceduring and the accompanying problems of storage, inventory, floor space and dough trough capacity. It also minimizes the losses due to mechanical failure or other unscheduled stoppages.

Unlike ordinary prolonged straight dough procedures, the fast process of the invention is characterized by doughs that maintain good extensibility (as evidenced by their ability to sheet out readily without tears or weak spots) and excellent easy processing properties on machinery. The loaf itself may absorb 1 to 3% more moisture than ordinary bread and have a volume that is as much as 5 to 10% larger than comparable breads made by conventional methods and recipes. Moreover, the breads of the instant invention are found to possess texture, grain and keeping qualities that exceed that of typical good loaves prepared by conventional means.

The unexpected results are associated with the combined effect of the three components: calcium salt, oxidizing agent and selected enzymes.

The calcium salt apparently serves as a nutrient in the growth and reproduction of the yeast cells used in fermentation of bread dough and accelerates the production of carbon dioxide. Suitable salts are calcium chloride, monocalcium phosphate, calcium carbonate, dicalcium sulfate, calcium lactate and calcium mono- and di-orthophosphate. The calcium phosphates are referred to collectively as calcium acid phosphates. Of the salts listed, the most suitable appears to be the calcium acid phosphates. The effective concentration of the calcium salt, when used in combination with other ingredients is in the range of about 0.03% to 1.0% based on the weight of total flour. The preferred concentration of calcium acid phosphate is about 0.3% based on flour weight.

The use of oxidizing agents has been suggested in some baking processes which are said to reduce fermentation time. These proposals, however, require different combinations than that described here and are not believed to be as effective as the present invention in achieving good machine processability and in improving product quality.

According to the present invention the most useful oxidizing agents are potassium iodate, potassium bromate and mixtures of them. Potassium iodate is most effective when used in the concentrations of 0.0005% to 0.003% based on total flour, and potassium bromate is most effective in the range of 0.001% to 0.01% based on weight of total flour. The bromate and the iodate are advantageously used together, and in such case the ratios are preferably maintained in the range of 1:3 to 1:8, potassium iodate to potassium bromate. A particularly effective combination is .001% potassium iodate and 0.004% potassium bromate which is, of course a ratio of 1:4.

It is believed that the reason that this combination is particularly effective is because the potassium iodate tends to show its effectiveness very early whereas that of the potassium bromate, which is sensitive to pH, is delayed somewhat by the slow development of fermentation acids. As a result, the iodate is effective predominantly right after the mixing stage whereas the bromate extends its effectiveness through the dough stage, the proofing stage and the first portion of the bake.

It would appear that the oxidizing agent functions to oxidize the natural reducing agents found in yeast, milk, and, most importantly, flour. Oxidizing doughs are aided in their development to tolerate machine handling through improved extensibility and dryness. Such doughs produce bread of fine grain, good texture, increased volume, improved tenderness and longer shelf life.

Although potassium iodate and bromate have been referred to prominently herein, it is recognized that other oxidizing agents can be used in this invention, and examples of such are ammonium persulfate, L-ascorbic acid, calcium bromate, calcium iodate, calcium peroxide, chlorine, chlorine, dioxide, benzoyl peroxide, acetone peroxide and azodicarbonamide.

The third necessary component in a dough mix made according to the invention is an enzyme mixture. In particular, the enzymes that have been found to be useful in the invention are combinations of fungal amylase and fungal protease.

These two enzymes, when inocrporated into a bread dough formula together with the oxidizing agent and the calcium salt, appear to act as biochemical catalysts that accelerate the rate of the chemical reactions, particularly the reactions which produce carbon dioxide gas, modify the flour starch, condition the gluten to retain gas and leaven the bread for baking.

Flour naturally contains cereal enzymes known as alpha and beta amylase. Together they are known as diastase. The beta form is usually present in effective amounts, but the alpha form is not. This deficiency has, in the past, been remedied by the incorporation of ground malted wheat. However, such a procedure has often resulted in sticky doughs and excessive softening of the bread crumb structure through excesive dextrinization. This is brought about by the fact that during the baking process cereal alpha amylase reaches its peak activity at the same temperature (about 160° F.) that starch gelatinization is accelerating.

However, the supplemental enzymes provided by the instant invention eliminate this drawback and at the same time promote the proper chemical reactions at the time they are needed.

One of these enzymes is fungal alpha amylase, which is derived from the mold *Aspergillus oryzae*. It functions to modify the amylase and amylopectin fractions of of the flour starch and effects a reduction in dough viscosity. The initial action occurs prior to baking but during fermentation when fungal alpha amylase hydrolyzes the small percentage of flour starch (2–5%) damaged in the milling process to dextrins, and the beta amylase converts the dextrins to sugar. Since the quantity of damaged flour starch is so low, no over-dextrinization occurs at this stage.

Subsequently, during the baking, the undamaged flour is gelatinized (beginning at about 150° F.) and only then does it become susceptible to enzymatic action. However, at the temperatures encountered during this process the activity of the fungal alpha amylase is decreasing. Indeed, the fungal alpha amylase is so much more heat sensitive than cereal amylase that it is only 50% active at 150° F. and is only about 3% active at 176° F. By reason of the lower inactivation temperatures of the fungal alpha amylase there is avoided the risk of over-dextrinization and the consequent undesirable gummy bread crumb.

The fungal alpha amylase, in conjunction with the naturally occurring beta amylase carry out the function of converting starch to sugars so as to increase the availability of maltose and dextrose to the yeast cells, which, in turn, convert them to carbon dioxide, alcohol and flavor components. The resulting bread is resistant to firming on aging and has improved volume, grain, texture and crust color.

The fungal protease enzyme is derived from *Aspergillus oryzae*. It is not normally found in flour and wheat protease has practically no effect on modifying the flour gluten, and even the malted wheat flour sometimes added to compensate for lack of alpha amylase has far less protease activity than is needed.

According to the invention, however, effective amounts of a fungal protease are used in combination with the fungal alpha amylase, calcium salt and the oxidizing agent. It is believed that, in part, the fungal protease catalyzes the hydrolysis of flour gluten by splitting the peptide linkages between the amino acids composing the complex and massive molecular structure of the protein. However, the fungal protease does not destroy the hydrogen and disulfide bonds of the amino acid chains, and it therefore complements and balances the effect of mixing and of oxidizing agents on the gluten.

Many advantages are associated with the proteolytic activity of the enzyme. Chief among these are a decreased mixing time, improved gas retention by the gluten, and acceleration of and development of dough extensibility and processability. The proteolytic activity also results in reduced proof time and improved pan flow. Moreover, it is found that loaves prepared with the proper proteolytic action have greater volume and improved symmetry as well as improved grain, texture and flavor.

Because the effects of the fungal protease and the fungal alpha amylase are complementary, they are used most effectively together. The activity of the fungal alpha amylase can be expressed in terms of SKB units, and the preferred level of activity is that provided by about 54,000 SKB units per 100 pounds of flour. However, both lesser and greater amounts are satisfactory. When levels in excess of about 150,000 are used, no detrimental effects are noted but there is a decided leveling off of beneficial enzyme activity, and hence from the cost standpoint there is a practical upper limit. At less than 3,000 SKB units it is difficult to appreciate the improved effects and therefore such a level may be considered a practical lower limit, and about 6,000 SKB units may be considered the lower commercial limit which is preferred as such.

The activity level of the fungal protease enzyme is conveniently expressed in terms of hemoglobin units. The preferred effective level of fungal protease in bread dough mixtures made according to the invention is 250,000 HU per 100 pounds of flour, however, both greater and lesser amounts are suitable, i.e. within the range of about 3,000 to 500,000. Higher levels tend to liquify the bread and a practical upper limit may be achieved where the liquefaction is in excess of that tolerated by the particular bread being made. Below about 3,000 HU it is difficult to perceive the improvement and about 6,000 HU may be considered the lower commercial limit which is preferred as such.

Although a protease level of 250,000 HU per 100 pounds flour is high, the activity is a function of time, and high levels are suited to the shortened processing schedule permitted by the instant invention, particularly in view of the inhibiting effect of salt on proteolytic action. The inhibiting effect of salt may be as high as 60% or more and for this reason variations in the salt levels may alter the optimum requirements of protease enzyme.

A typical and very satisfactory recipe according to the instant invention is given in Table I below:

TABLE I

| Ingredient: | Amount added to dough batch containing 100 lbs. of flour |
|---|---|
| Potassium iodate | .001 lb. |
| Potassium bromate | .004 lb. |
| Calcium acid phosphate | .29 lb. |
| Fungal alpha amylase | 54,400 SKB units |
| Fungal protease | 250,000 HU units |

The storing, handling and incorporation of all of the components constituting the bread improver of the invention into a dough mix is most conveniently accomplished by means of a packaged mix which contains all of the ingredients in concentrated form in a filler medium. The filler is itself basically a dough mix of flour, shortening, starch, salt, etc., which can be readily incorporated into the master dough batch.

As mentioned before, bread compositions and additives have been previously proposed for the purpose of reducing or eliminating fermentation time. However, until now such effect was achieved only by some sacrifice in bread quality. The instant invention is formulated to eliminate fermentation time while maintaining or even improving bread quality. Comparative tests on a commercial scale as set forth below in Example 1 confirm these findings.

EXAMPLE 1

Several bread doughs were prepared. One of these was a control dough formulation (A). Another was a dough (B), similar to (A), but into which was incorporated the composition of the instant invention in concentrations shown in the table above. A third dough (C), similar to (B), but including .005 lb. of ascorbic acid with a 50% proportionate reduction in the oxidant concentration was prepared. The ingredients for the doughs were initially mixed at medium speed for 20 minutes. No independent fermentation or sponge time was allotted to the batches. The doughs were processed on the following schedule:

| | |
|---|---|
| Floor time, min. | 20 |
| Dough temp., ° F. | 84 |
| Make-up time, min. | 12 |
| Proof time, min. | 60 |
| Bake time, min. | 30 |
| Bake temp., ° F. | 400 |

During processing the doughs of the invention indicated superior dough sheeting (extensibility) and pan flow as compared with the control dough.

After baking the breads were found to be acceptable. However, the loaves made according to the invention had about at least 10% larger volume. Moreover, the bread of the invention was found superior in grain and texture. The height of the control loaf at the mid-point was 4 inches (specific volume 5.50 cc./g.) whereas the loaves of the invention were 4½ inches (specific volume 5.98 cc./g.) and 4¾ inches (specific volume 6.32 cc./g.), respectively. In most other respects the breads were equivalent, except that the bread made according to the invention exhibited superior shelf life* as measured on a Hansaloy bread softness gauge. Baked loaves are periodically tested for freshness by means of a Hansaloy bread softness gauge as follows: The bread loaves of approximately 1 lb. net weight are stored in waxed paper bags 1 hour after bake, and then sliced into 21 slices having a thickness of 7/16 of an inch. Bread slices #3, 7, 11, 15 and 19 are used for compressimeter readings for each bread loaf. The Hansaloy compressimeter measures "freshness" by measuring the depression (in millimeters) caused by dropping a weighted plunger onto the bread slice. The depression is registered on a scale having units of 0 to 30. These readings are averaged for each loaf, and are compared with the averaged readings of other similar loaves of bread at various time intervals.

In general, the relaxation or floor time of a yeast leavened bread dough product of the invention need be ---
*Hansaloy.

no greater than about 40 minutes, and usually no more than about 20 or 30 minutes. The invention readily lends itself to either batch or continuous operation.

|  | Control (A) | (B) | (C) |
|---|---|---|---|
| Day: | | | |
| 1 | 8.4 | 9.5 | 9.0 |
| 2 | 6.82 | 8.0 | 8.1 |
| 3 | 6.6 | 7.5 | 7.5 |
| 4 | 6.2 | 7.0 | 7.1 |

Although extended shelf life is an important benefit of using the composition of the invention, it has been unexpectedly found that the freshness of bread prepared according to the invention can be extended for considerable periods of time by the addition of small quantities of certain surface active agents or emulsifiers.

Of particular interest here are calcium stearyl-2-lactylate and sodium stearyl fumarate. Both of these emulsifiers are known as being useful in extending the "shelf life" of bread. However, we have discovered that even normal levels of such emulsifiers exhibit unusual activity in the presence of the oxidizer-calcium salt-enzyme additives of the present invention. The effect is apparently synergistic, and the result has been to extend the useful shelf life of the bread by as much as 3 days as contrasted with breads having no emulsifier and by as much as 2 days for breads having equivalent amounts of emulsifying agent but not containing the three component system of the invention. The effectiveness of the emulsifiers is greater for larger quantities; however, significant effects are achieved predominantly with concentrations in the range of 0.25 to 0.50 part by weight per 100 parts of flour.

A convenient way of measuring bread freshness and hence the "shelf life" of the bread is by means of a compressimeter. This is an instrument that measures the deformation of the bread slice by a predetermined applied force. Readings are high for more tender slices of bread and consequently are considered to be of higher quality. As the readings are recorded over a period of days, the loaves of higher quality have a slower rate of increased firmness and the compressimeter readings do not decrease as rapidly as those for loaves of lower quality. It has been established that compressimeters are a measure of the consumers "squeeze" test and "eating quality" of bread loaves since the majority of consumers prefer bread of a soft "silky" texture.

As shown below in Example 2 a bread product utilizing the combination of oxidizing agent, calcium salt, amylase-protease enzymes, and an emulsifier selected from the group consisting of calcium stearyl-2-lactylate and sodium stearyl fumarate, has a compressimeter freshness that is markedly improved over what could be expected by standard bread doughs containing the same emulsifiers.

EXAMPLE 2

Doughs for white bread were prepared from a standard recipe containing:

|  | Parts |
|---|---|
| Flour | 100 |
| Sugar | 4 |
| Shortening (non-emulsifying) | 4 |
| Milk, non-fat dry | 4 |
| Compressed yeast | 3 |
| Salt | 2 |
| Water | 60 |

Together these ingredients formed a standard control dough formulation to which other ingredients are added. One portion of the dough is prepared using, in addition to the above ingredients, the three component system of the present invention in the recipe quantities set forth above in Table I. Portions of this latter dough are prepared in which in addition to the ingredients of Table I there are added varying quantities of either sodium stearyl fumarate or calcium stearyl-2-lactylate. Both of these two surface active agents are also separately incorporated into a portion of the standard dough which does not contain the oxidizer, enzyme, or calcium salt components.

The doughs containing the three component system of the invention are processed under the following conditions:

(1) Mixing for 20 minutes to full development; dough temperature at 84° F.
(2) No fermentation time; floor time of 20 minutes before dividing.
(3) Intermediate proof of 12 minutes; proof of 60 minutes at about 105° F. and about 95% humidity.
(4) Bake for 30 minutes at 400° F.

The dough which did not contain the three component system of the invention is processed under the identical conditions except that after the mixing step a fermentation period of 1½ hours was allowed.

The compressimeter readings for each of the types of bread prepared indicate that the presence of the surface active agents in "standard" and "improved" loaves increases the freshness of the loaves. Furthermore, freshness is improved to a greater degree in the "improved" bread as compared to the "standard" bread.

Considerable improvement in shelf life is obtained by incorporating the emulsifying agents into a bread dough recipe containing the ingredients as specified in Table I.

At almost anytime past the first 24 hours, when most breads show substantial freshness, the breads containing both the basic bread improver and the emulsifying agent of the present invention are found to be at least 24 hours "fresher" than the counterpart bread having the same emulsifier but no bread improver.

EXAMPLE 3

"Improved" breads were prepared with calcium acid phosphate proportions as high as 1 lb. in place of the calcium acid phosphate proportions used in Example 1.

At .5 lb. the loaf volume was about 10% greater than the control; the compressibility freshness on the 4th day was better than was the control freshness on the 1st day; and, the grain and texture were the best of all the samples. The loaf height was 4⅝ inches.

At .75 lb. the loaf volume was about 16% greater than the control; the compressibility freshness was significantly better than the control for the first 3 days, however, they were about the same for the 4th day; and, the grain and texture were very good. The loaf height was 4¾ inches.

At 1.0 lb. the loaf volume was about 8% greater than the control; the compressibility freshness was improved over the control for only the 1st day; and, the grain and texture were very good. The loaf height was 4½ inches.

Since certain changes may be made in the above invention without departing from the scope of the invention herein involved, it is intended that all matter contained in the above description shall be interpreted as illustrative and not in a limiting sense.

What is claimed is:

1. A yeast leavened bread dough containing a composition consisting essentially of about 0.0005 to 0.010 part by weight per 100 parts of flour employed in said dough of an oxidizing agent, about 0.03 to 1.0 part by weight of calcium salt per 100 parts flour employed in said dough, and catalytically active quantities of enzyme selected from the class consisting of fungal alpha amylase and fungal protease, wherein said fungal alpha amylase enzyme is sufficient to provide between 3,000 and 150,000 SKB units for 100 pounds of flour employed in said dough and said fungal protease enzyme is sufficient to provide between 3,000 and 500,000 hemoglobin units for 100 pounds of flour employed in said dough.

2. The bread dough composition according to claim 1 wherein the oxidizing agent is selected from the class consisting of potassium iodate, potassium bromate and ascorbic acid.

3. The bread dough composition according to claim 2 wherein said potassium iodate is selected in amounts of about 0.0005 to 0.003 part per 100 parts flour, and said potassium bromate is selected in amounts of about 0.001 to 0.01 part per 100 parts of flour.

4. The bread dough composition according to claim 3 wherein said potassium iodate and said potassium bromate are selected as a mixture and the ratio of the iodate to the bromate is between 1:3 and 1:8.

5. The bread dough composition according to claim 1 wherein said calcium salt is monocalcium phosphate.

6. The bread dough composition according to claim 1 wherein said fungal alpha amylase enzyme is sufficient to provide between 6,000 and 150,000 SKB units for 100 pounds of flour.

7. The bread dough composition according to claim 1 wherein said fungal protease enzyme is sufficient to provide between 6,000 and 500,000 hemoglobin units for 100 pounds of flour.

8. The bread dough composition according to claim 1 wherein said fungal alpha amylase and said fungal protease are both present in catalytically active quantities.

9. The bread dough composition according to claim 8 wherein:
(1) said oxidizing agent includes ascorbic acid; and
(2) said calcium salt is a calcium acid phosphate.

10. The bread dough composition according to claim 9 wherein said composition includes a peroxide compound.

11. The bread dough composition according to claim 1 which contains, in addition, an emulsifier selected from the class consisting of sodium stearyl fumarate and calcium stearyl-2-lactylate.

12. The bread dough composition according to claim 11 wherein the amount of said emulsifier is selected between about 0.25 and 0.50 part per 100 parts flour.

13. The process for making a yeast leavened bread dough product comprising the steps of:
(a) forming a dough by combining normal bread dough ingredients including flour, water, milk solids, sugar and salt with (1) an oxidizing agent in weight proportion of between about 0.0005 to 0.010 part for 100 parts of flour, (2) about 0.03 to 1.0 part by weight of a calcium salt for 100 parts of flour and (3) an enzyme selected from the group consisting of (i) fungal alpha amylase to provide at least 3,000 SKB units for 100 pounds of flour and, (ii) fungal protease to provide at least 3,000 hemoglobin units for 100 pounds of flour, said combination step being accomplished with essentially no independent fermentation time;
(b) substantially immediately relaxing the dough for a period not in excess of 40 minutes; and
(c) substantially immediately processing the dough for proofing and baking.

14. The process according to claim 13 wherein in the mixing step there is added the additional ingredient of an emulsifying agent selected from the class consisting of sodium stearyl fumarate and calcium stearyl-2-lactylate.

15. The process according to claim 14 wherein said emulsifying agent is present in amounts between about 0.25 and 0.50 part per 100 parts of flour.

16. The process according to claim 13 wherein said oxidizing agent is selected from the group consisting of said potassium bromate in an amount from about 0.001 to 0.01 part per 100 parts of flour, and potassium iodate in an amount from about 0.0005 to 0.003 part per 100 parts flour.

17. The process according to claim 16 wherein both said potassium bromate and said potassium iodate are selected, and the ratio of the amount of bromate to the amount of iodate is between 1:3 and 1:8.

18. The process according to claim 17 wherein the ratio of potassium bromate to potassium iodate is about 1:4.

19. The process according to claim 13 wherein said fungal alpha amylase enzyme provides between about 6,000 and 150,000 SKB units and said fungal protease enzyme provides between about 6,000 and 500,000 hemoglobin units.

20. The process according to claim 19 wherein said fungal alpha amylase provides about 54,000 SKB units and the fungal protease provides about 250,000 hemoglobin units.

21. A dough additive for addition to a flour containing dough mixture, which additive permits substantial reduction in the fermentation time of said dough mixture, said additive consisting essentially of the following ingredients:
(a) oxidizing agent;
(b) calcium salt;
(c) fungal alpha amylase enzyme; and
(d) fungal protease enzyme;

wherein the proportions of said ingredients are based upon the weight of 100 pounds of said flour in said dough mixture and are in the following amounts:
(a) 0.0005 to 0.010 pound;
(b) 0.03 to 1.0 pound;
(c) 3,000 to 150,000 SKB units; and
(d) 3,000 to 500,000 hemoglobin units.

22. The additive of claim 21 wherein the oxidizing agent is selected from the class consisting of potassium iodate, potassium bromate and ascorbic acid.

23. The additive of claim 22 wherein said potassium iodate and said potassium bromate are selected as a mixture and the ratio of the iodate to the bromate is between is monocalcium phosphate.

24. The additive of claim 21 wherein said calcium salt 1:3 and 1:8.

25. The additive of claim 21 wherein said fungal alpha amylase enzyme is sufficient to provide between 6,000 and 150,000 SKB units for 100 pounds of flour.

26. The additive of claim 21 wherein said fungal protease enzyme is sufficient to provide between 6,000 and 500,000 hemoglobin units for 100 pounds of flour.

References Cited

UNITED STATES PATENTS

| | | | |
|---|---|---|---|
| 1,158,933 | 11/1915 | Kohman et al. | 99—91 |
| 3,494,770 | 2/1970 | Smerak et al. | 99—90 |

RAYMOND N. JONES, Primary Examiner

J. R. HOFFMAN, Assistant Examiner

U.S. Cl. X.R.

99—91

UNITED STATES PATENT OFFICE
CERTIFICATE OF CORRECTION

Patent No. 3,578,462               Dated    May 11, 1971

Inventor(s)   Louis J. Smerak and Jason A. Miller

It is certified that error appears in the above-identified patent and that said Letters Patent are hereby corrected as shown below:

Column 1, line 49 correct spelling of "lightness".
Column 1, line 54 correct spelling of "fermentation".
Column 4, line 31 correct spelling of "incorporated".
Column 4, line 56 delete "of".
Column 6, line 75 delete "." after "Hansaloy" and insert therefor --:--. Insert after said ":" the table in column 7, lines 4-10.
Column 7, lines 4-10 delete the entire table.
Claim 23, column 10, line 44 delete "is monocalcium phosphate" and insert therefor --1:3 and 1:8--.
Claim 24, column 10, line 46 delete "1:3 and 1:8" and insert therefor --is monocalcium phosphate--.

Signed and sealed this 24th day of August 1971.

(SEAL)
Attest:

EDWARD M. FLETCHER, JR.           WILLIAM E. SCHUYLER, JR.
Attesting Officer                Commissioner of Patents